A. J. HODGE & H. B. RUGGLES.
BARREL HEAD SEAL.
APPLICATION FILED AUG. 9, 1915.
1,276,364.
Patented Aug. 20, 1918.
2 SHEETS—SHEET 1.
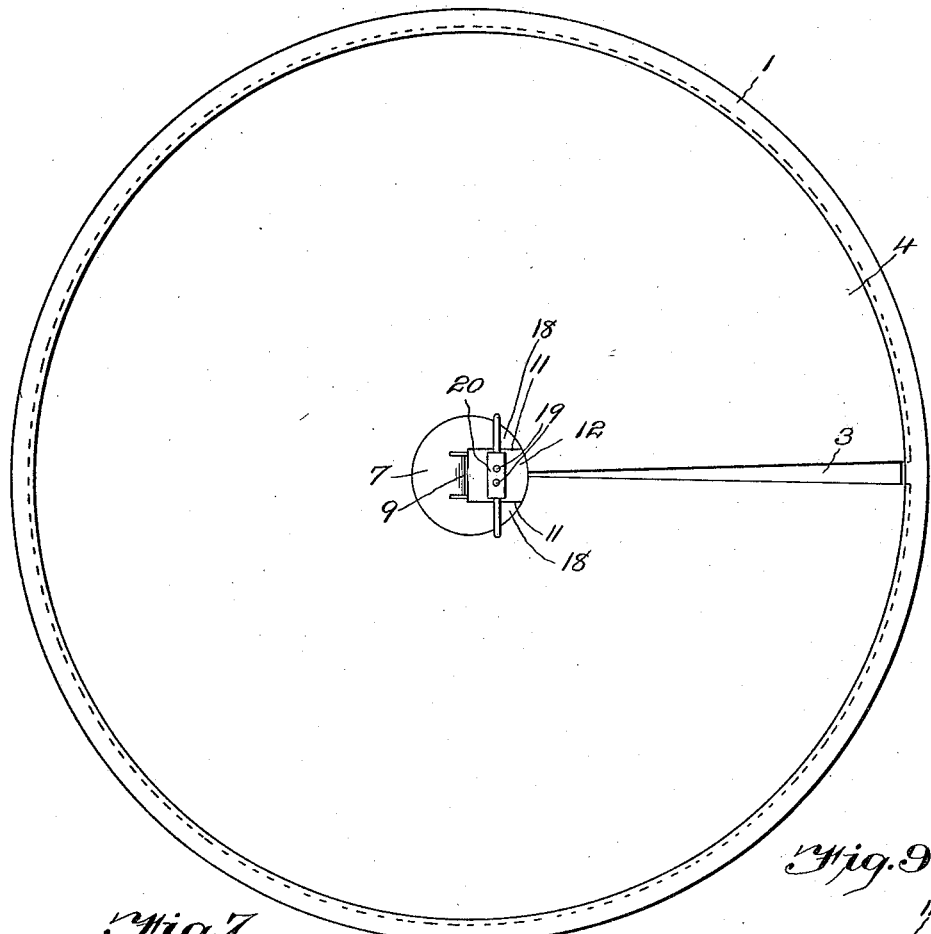
Fig. 1.
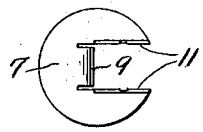
Fig. 7.
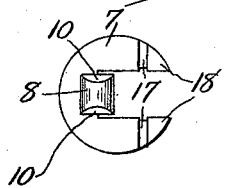
Fig. 8.
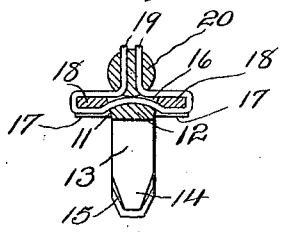
Fig. 6.
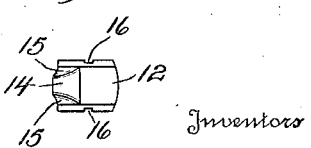
Fig. 9.
Fig. 10.
Inventors
A. J. Hodge
H. B. Ruggles
By Wm. N. Bates
Attorney A. J. HODGE & H. B. RUGGLES.
BARREL HEAD SEAL.
APPLICATION FILED AUG. 9, 1915.
1,276,364.
Patented Aug. 20, 1918.
2 SHEETS—SHEET 2.
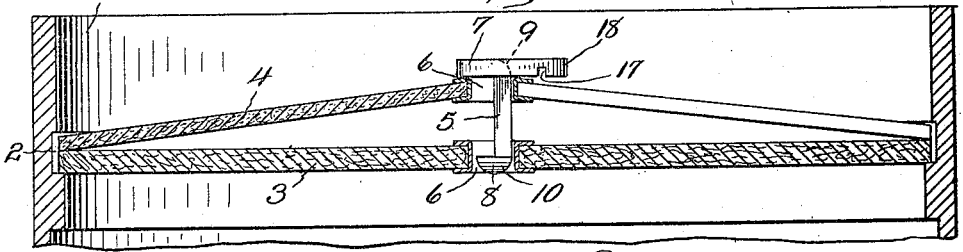
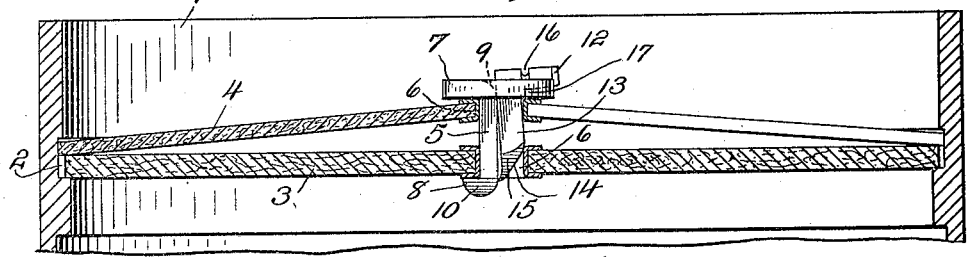
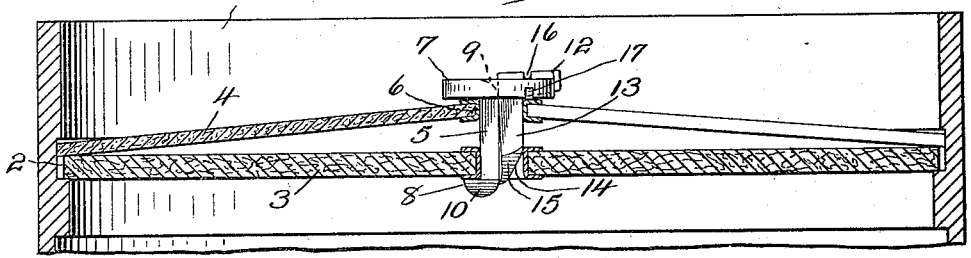
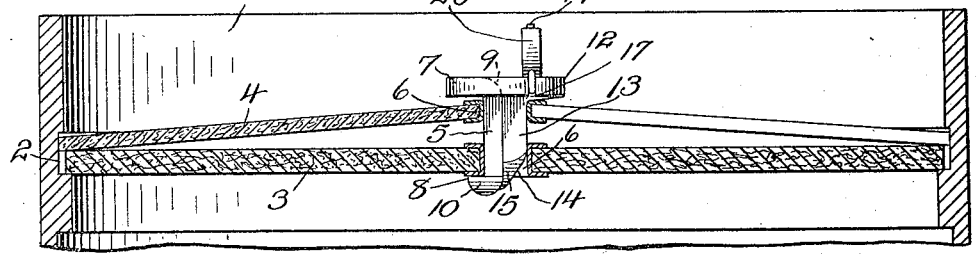
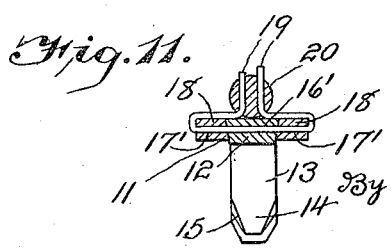
Inventors
A. J. Hodge
H. B. Ruggles
Wm H Bates
By
Attorney

UNITED STATES PATENT OFFICE.

ARTHUR J. HODGE AND HENRY B. RUGGLES, OF PASADENA, CALIFORNIA, ASSIGNORS TO AMERICAN PRODUCTS COMPANY.

BARREL-HEAD SEAL.

1,276,364.

Specification of Letters Patent.

Patented Aug. 20, 1918.

Application filed August 9, 1915. Serial No. 44,454.

*To all whom it may concern:*

Be it known that we, ARTHUR J. HODGE and HENRY B. RUGGLES, citizens of the United States of America, residing at Pasadena, in the county of Los Angeles and State of California, have invented certain new and useful Improvements in Barrel-Head Seals, of which the following is a specification.

This invention has relation to certain new and useful improvements in seals and fasteners for barrel heads and the like, and has for its primary object, the provision of a barrel head seal which will be especially adapted for securing and sealing in position barrel heads of the type shown in our co-pending applications, Serial Nos. 21,432 and 24,077.

The invention has for another object, the provision of a seal and fastener which will serve to hold together two spaced head members when one of them has been expanded radially for retaining the same in this position to prevent withdrawal of said head from the barrel or other receptacle within which said head is positioned.

The invention has for another object, the provision of an improved form of seal and fastener of this character, in which the main member will serve to catch and hold together the spaced head members, while the auxiliary member of the seal serves to retain the main member in proper position and said main and auxiliary members are locked together by a locking wire which has secured thereon the seal proper, thereby making it impossible to remove the head without first destroying the seal proper or the locking wire and leaving traces of the act.

The invention has for a further object, the provision of a barrel head seal and fastener of this character, which will be constructed in such manner that it may be readily placed in position and locked by the locking wire and the seal proper after the head has been placed in position within the receptacle.

A still further object of the invention resides in the provision of a barrel head seal and fastener of this character which will be of extremely simple construction, composed of the minimum number of parts and highly efficient in use.

With these and other objects in view, the invention consists in the novel construction, combination and arrangement of parts as will be hereinafter more in detail described, and the asserted novelty specifically pointed out in the claims.

In the accompanying drawings, which clearly and fully illustrate the invention:—

Figure 1 is a top plan view of a barrel head secured and sealed in position with our improved barrel head seal, Fig. 2 is a transverse section through the barrel head and barrel, with the seal inserted through the barrel head members, Fig. 3 is a view similar to Fig. 2, with the main seal member in operative position, the outer head member in binding engagement with the croze of the barrel and the auxiliary seal member in position to be forced downwardly to its operative position, Fig. 4 is a similar view with the auxiliary seal member forced downwardly slightly and the main portion of the same entering the central opening of the inner head member to lock the main seal member in position, Fig. 5 is a similar view with the auxiliary seal member in its innermost or operative position and the locking wire and seal proper applied to lock together the main and auxiliary seal members and securely fasten and seal the head in position within the barrel, Fig. 6 is a detail vertical transverse section through the barrel head seal with all of the parts assembled and locked together, Fig. 7 is a detail top plan view of the main seal member, Fig. 8 is a bottom plan view of the same, Fig. 9 is a top plan view of the auxiliary seal member, and Fig. 10 is a bottom plan view of the auxiliary seal member, Fig. 11 is a view similar to Fig. 6, showing a slightly modified form of the device.

Referring more particularly to the drawings, in which similar reference characters designate corresponding parts throughout the several views, 1 designates a portion of a barrel or other receptacle having a croze 2 of conventional form, within which the edges of the head members 3 and 4 of an expanding head, such as shown in our previously referred to co-pending applications, Serial Nos. 21,432 and 24,077, are forced when the head members 3 and 4 are expanded to tighten the head in the receptacle.

It will be noted that the form of expanding head shown in this application for the purpose of illustrating the construction and application of the present barrel head seal, resembles in construction the head shown in the co-pending application, Serial No. 24,077, but it will be understood that this barrel head seal is also adapted to the form of head shown in the co-pending application, Serial No. 21,432, and in fact any form of receptacle head composed of two or more spaced members having central apertures through which the shank 5 of the main seal member may be engaged, as will be later clearly understood.

As clearly shown in the drawings, the head members 3 and 4 which are preferably made of compressed pulp, fiber, or the like have their central portions spaced apart and are provided with square central apertures 6, but the shape and size of the openings 6 may be readily varied and the shank 5 of the main seal member, while shown as being of rectangular form in cross section, may also be readily changed in shape to correspond with the shape of the openings 6. The shape of the openings 6 and size of the same, and the shape and size of the shank 5 should not be changed, however, so as to permit withdrawal or turning of the shank 5.

When placing the seal in proper position, the shank 5 of the main seal member is inserted through the openings 6, and the central portions of the head members 3 and 4 thereby forced toward one another and the head expanded until the outer edge of at least one head member presses against the main wall of the croze 2, and the upper flat and preferably circular body 7 of said main seal member rests against the outer face of the outer head member 4 and covers the central opening 6 of the latter.

The main seal member is then moved to one side of the central openings 6 until the outer face of the shank 5 is engaged against one wall of said central openings 6 and the right angled lower hook end 8 of the shank 5 engages the lower or inner face of the inner head member 3 adjacent the central opening 6 thereof, thereby preventing movement of the central portion of the head member 4 away from the head member 3 and securely retaining the head in expanded and locked position in the receptacle.

By referring to Figs. 7 and 8 of the drawings, it will be readily seen that the shank 5 is shown as being formed with the circular body 7 of the main seal member, and bent down from about the center of the same after said circular body 7 is slit inwardly along the opposite sides of the main portion of the shank 5 to a point slightly past the center of said body, to separate said shank 5 from said body 7 and permit the same to be bent downwardly. It will also be noted that the upper and lower ends of the shank 5 are beveled or rounded, as shown at 9 and 10 respectively, while the walls 11 of the sides of the opening provided in the body 7 by bending downwardly the shank 5, are beveled inwardly and downwardly to receive and form a support for the inwardly and downwardly beveled side faces of the upper flat portion 12 of the auxiliary seal member, the right angled depending portion 13 of which is forced downwardly through the openings 6 to fill the space between the inner face of the shank 5 and the opposite wall of said openings 6, and thereby prevent a return of the shank 5 to the center of said openings 6 and disengagement of the right angled lower hook end 8 of said shank 5 from the inner head member 3. It will further be noted that the right angled depending portion 13 of the auxiliary seal member may be readily inserted, owing to the fact that the lower end of the same is beveled upon its outer face, as shown at 14 and the edge thereof bent inwardly slightly, as shown at 15 to slide over the beveled or rounded upper and lower ends 9 and 10 of the shank 5 of the main seal member.

After the auxiliary seal member or secondary seal member has been forced into position and seated properly, a locking wire is passed through the transverse groove 16 in the upper face of the upper flat portion 12 of said auxiliary or secondary seal member and through the grooves 17 registering with the groove 16 and formed transversely in the under faces of the portions 18 of the circular body 12 of the main seal member, opposite and to each side of the upper flat portion 12 of said auxiliary or secondary seal member. The opposite ends of the locking wire, designated by the reference character 19, are then bent upwardly and over the main and auxiliary seal members and brought into parallel relation, as clearly shown in Fig. 6, after which a seal proper 20 is engaged over the same and squeezed to prevent removal of the locking wire 19 without destruction of the same or of the seal proper 20, thereby making it impossible for unauthorized parties to break the seal and remove the barrel head without leaving traces of their act.

In Fig. 11, a slightly modified form of the invention is shown, in which the locking wire 19 has its main or central portion extended through apertures 17' and 16' which extend transversely through solid portions of the main and auxiliary seal members, before the ends of the locking wire are bent across the top of the seal members and extended upwardly to receive the seal proper 20. Otherwise the construction and arrangement of the various parts of the invention remain the same.

While the preferred embodiment of the invention has been shown and illustrated, it will be understood that minor changes in the details of construction and arrangement of parts may be resorted to within the scope of the appended claims without departing from the spirit of the invention or sacrificing any of the advantages of the same.

What is claimed is:—

1. A barrel head seal and fastener comprising a main seal member for locking together a plurality of head members, said member having a flange engaging one of said head members and a flange engaging the other head member, an auxiliary seal member for preventing movement of said main seal member, and means for locking together said main and auxiliary seal members.

2. A barrel head seal comprising a main seal member for engagement through a plurality of head members to hold them when the head is expanded, said member having a flange engaging one of said head members and a flange engaging the other head member, an auxiliary seal member for retaining said main seal member in position, and means for locking together said main and auxiliary seal members.

3. A receptacle head seal comprising a main seal member for holding a plurality of receptacle head members when they have been drawn together and the head expanded, said member having a flange engaging one of said head members and a flange engaging the other head member, an auxiliary seal member engaged with said main seal member to retain the latter in position, and a locking wire and seal for locking together said main and auxiliary seal members and sealing the receptacle head in position in a receptacle.

4. A receptacle head seal comprising a main seal member for holding a receptacle head within a receptacle when said head has been expanded, said member having a flange engaging one of said head members and a flange engaging the other head member, an auxiliary seal member for retaining said main seal member in operative position, a locking member for locking together said main seal member and said auxiliary seal member, and a seal for engagement with said locking member to prevent removal of the same.

5. A receptacle head seal and fastener made up of a latch member having a pressure receiving head and a latching head, the said member when receiving pressure being adapted to connect the parts of a receptacle head, and an auxiliary seal member adapted to be inserted through the pressure receiving head of the other member for keeping it in place.

6. A receptacle head seal and fastener for a two part receptacle head comprising a head holding seal member having a recessed head at one end and a latching head at the other end, an auxiliary seal member adapted to be inserted through the apertured pressure head of the latching seal member for holding said latter member in latched position, and a sealing means for holding said members together.

In testimony whereof we affix our signatures.

ARTHUR J. HODGE.
HENRY B. RUGGLES.

Copies of this patent may be obtained for five cents each, by addressing the "Commissioner of Patents, Washington, D. C."